(12) United States Patent
Jerrard-Dunne

(10) Patent No.: US 11,228,577 B2
(45) Date of Patent: Jan. 18, 2022

(54) CLOUD APPLICATION ACTING ON BEHALF OF USER

(71) Applicant: International Business Machines Corporation, Armonk, NY (US)

(72) Inventor: Stanley K. Jerrard-Dunne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/209,450

(22) Filed: Dec. 4, 2018

(65) Prior Publication Data

US 2020/0177577 A1    Jun. 4, 2020

(51) Int. Cl.
*H04L 29/06* (2006.01)
*H04L 12/58* (2006.01)
*H04L 29/08* (2006.01)
*H04L 9/32* (2006.01)

(52) U.S. Cl.
CPC ........ *H04L 63/0815* (2013.01); *H04L 9/3213* (2013.01); *H04L 51/046* (2013.01); *H04L 67/02* (2013.01)

(58) Field of Classification Search
CPC ... H04L 63/0815; H04L 51/046; H04L 67/02; H04L 9/3213; H04L 67/2861
See application file for complete search history.

(56) References Cited

U.S. PATENT DOCUMENTS 9,223,557 B1 * 12/2015 Gigliotti ............... H04L 63/101
9,432,355 B2 * 8/2016 Akella .................... G06F 21/41

| 2004/0123144 A1* | 6/2004 | Chan | H04L 63/0281 726/8 |
| 2009/0249439 A1* | 10/2009 | Olden | H04L 63/0815 726/1 |
| 2012/0185874 A1* | 7/2012 | Cookson | H04L 67/10 719/313 |
| 2012/0226813 A1* | 9/2012 | Ragusa | H04L 67/142 709/227 |

(Continued)

OTHER PUBLICATIONS

IP.com Search Query Aug. 13, 2020 (Year: 2020).*

(Continued)

*Primary Examiner* — Taghi T Arani
*Assistant Examiner* — Blake I Narramore
(74) *Attorney, Agent, or Firm* — Troutman Pepper Hamilton Sanders LLP

(57) ABSTRACT

Embodiments are directed to a method of enabling cloud applications to act on behalf of a user, including: providing, by the processor, a plugin integrated with a web browser; configuring, by the processor, a plurality of cloud applications and one or more identity providers in the plugin; wherein the plurality of configured cloud applications are associated with the one or more identity providers; authenticating, by the processor, a user identity through one of the plurality of configured cloud applications; generating, by the one or more identity providers, an identity token responsive to authentication; providing, by the one or more identity providers, each of the plurality of configured cloud applications with the identity token; and acting, by any of the plurality of configured cloud applications, on behalf of the user with the identity token.

15 Claims, 4 Drawing Sheets

(56) References Cited

U.S. PATENT DOCUMENTS

| | | | |
|---|---|---|---|
| 2015/0348042 A1* | 12/2015 | Jivraj | G06Q 20/322 |
| | | | 705/44 |
| 2016/0315842 A1* | 10/2016 | Boss | H04L 65/80 |
| 2017/0039525 A1* | 2/2017 | Seidle | G06Q 10/1053 |
| 2017/0134514 A1* | 5/2017 | Greifeneder | H04L 67/22 |
| 2017/0180351 A1* | 6/2017 | Lu | H04L 67/146 |
| 2017/0195317 A1* | 7/2017 | Manza | G06F 21/41 |
| 2017/0329957 A1* | 11/2017 | Vepa | G06F 21/34 |
| 2018/0013763 A1* | 1/2018 | Wilson | H04L 63/0884 |
| 2019/0068627 A1* | 2/2019 | Thampy | H04L 63/1425 |
| 2020/0104868 A1* | 4/2020 | Schubert | G06Q 30/0206 |
| 2020/0104893 A1* | 4/2020 | Schubert | G06Q 20/209 |
| 2020/0160422 A1* | 5/2020 | Schubert | G06Q 30/0641 |
| 2021/0133160 A1* | 5/2021 | Craft | G06F 16/148 |

OTHER PUBLICATIONS

Adobe Systems, Inc, "Single Sign-on for non Flash multiple applications across heterogeneous platforms," Apr. 21, 2011, IP.com No. IPCOM000206520D.

Amazon.com, "AWS Single Sign-On | Cloud SSO Service." Retrieved from the Internet: URL: http:aws.amazon.com/single-sign-on [retrieved on Aug. 9, 2018].

\* cited by examiner

CLOUD APPLICATION ACTING ON BEHALF OF USER

TECHNICAL FIELD

The present disclosure relates generally to a system, method and computer program product which allows cloud applications to act on behalf of a user, without manual authentication of a user identity for each cloud application individually.

BACKGROUND

A server application can provide a user with a user interface to authenticate the identity of the user. If the authentication is successful, the server application can be authorized to act on behalf of the user. However, if there are a large number of server applications or large numbers of application components spread across cloud providers and often segregated within containers, for example, remote cloud applications in a container based architecture, the user needs to authenticate and authorize each cloud application or component individually, which is troublesome for the user. Many server based applications or application components are deployed to act on behalf of users without specific interactions by the user through a user interface, for example robots processing data on behalf of the user.

Single sign on technology allows for client code (running in a browser) to share a common authentication object, which means that the user signs in once and can access all his applications within this browser context. However, some cloud applications do not have a user interface and therefore cannot participate in single sign on.

There is a need to allow cloud applications to act on behalf of a user, without manual authentication of a user identity for each cloud application individually.

SUMMARY

Embodiments provide a computer implemented method in a data processing system comprising a processor and a memory comprising instructions, which are executed by the processor to cause the processor to implement the method for enabling cloud applications to act on behalf of a user, the method comprising: providing, by the processor, a plugin integrated with a web browser; configuring, by the processor, a plurality of cloud applications and one or more identity providers in the plugin; authenticating, by the processor, a user identity by a cloud application not configured in the plugin through the one or more identity providers; generating, by the one or more identity providers, an identity token responsive to authentication of the cloud application not configured in the plugin; providing, by the one or more identity providers, each of the plurality of configured cloud applications with the identity token; and acting, by any of the plurality of configured cloud applications, on behalf of the user with the generated identity token.

Embodiments provide a computer program product for enabling cloud applications to act on behalf of a user, the computer program product comprising a computer readable storage medium having program instructions embodied therewith, the program instructions executable by a processor to cause the processor to: provide a plugin integrated with a web browser; configure a plurality of cloud applications and an identity provider in the plugin; wherein the plurality of configured cloud applications are associated with the identity provider; authenticate a user identity through one of the plurality of configured cloud applications; generate, by the identity provider, an identity token responsive to authentication; provide, by the identity provider, each of the plurality of configured cloud applications with the identity token; and act, by any of the plurality of configured cloud applications, on behalf of the user with the identity token.

Embodiments provide a system for enabling cloud applications to act on behalf of a user, comprising: a plugin integrated with a web browser; and a processor configured to: configure a plurality of cloud applications and an identity provider in the plugin; wherein the plurality of configured cloud applications are associated with the identity provider; authenticate a user identity through one of the plurality of configured cloud applications; generate, by the identity provider, an identity token responsive to authentication; provide, by the identity provider, each of the plurality of configured cloud applications with the identity token; and act, by any of the plurality of configured cloud applications, on behalf of the user with the identity token.

Additional features and advantages are apparent from the following detailed description that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 1:
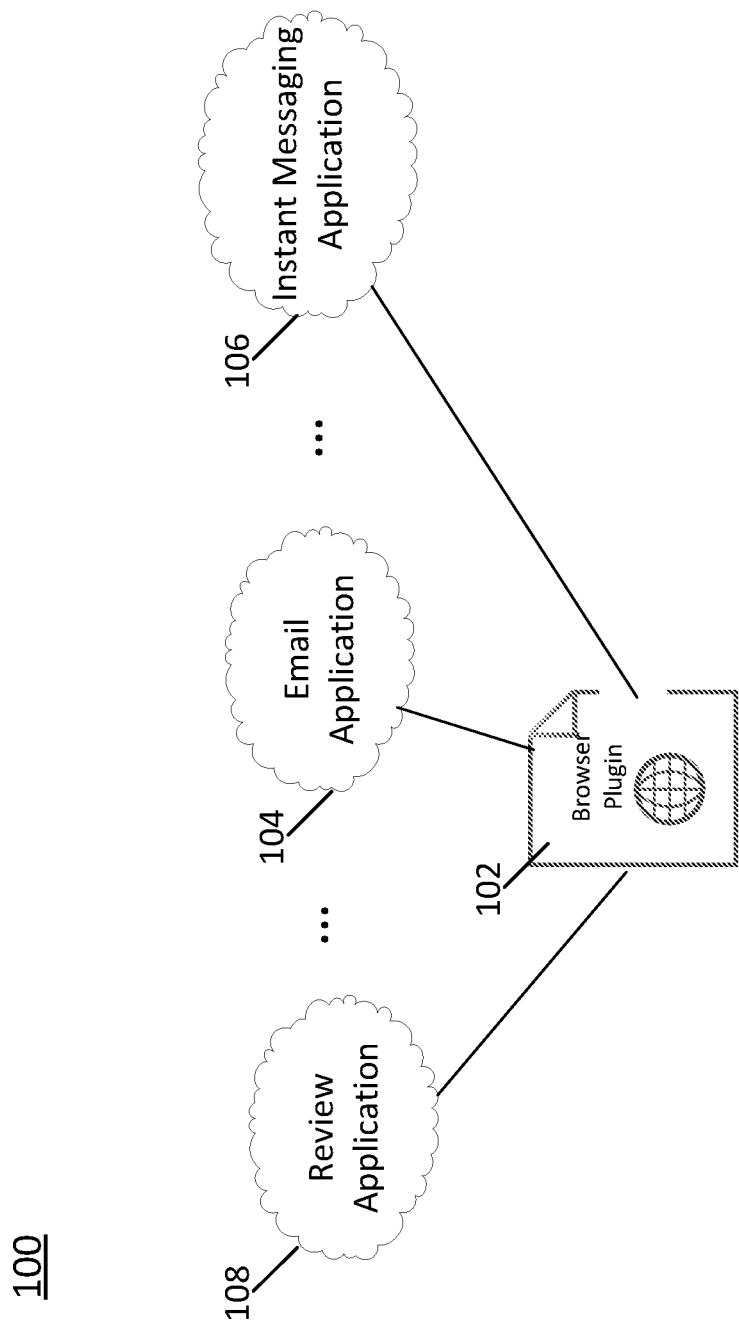
FIG. 1 is a diagram depicting an architecture 100 of enabling cloud applications to act on behalf of a user, according to embodiments provided herein.

The present invention may be a system, a method, and/or a computer program product. The computer program product may include a computer readable storage medium (or media) having computer readable program instructions thereon for causing a processor to carry out aspects of the present invention. According to embodiments disclosed herein, the disclosure provides a system, method and computer program product, which allows cloud applications to act on behalf of a user, without authentication of a user identity for each cloud application individually.

A cloud application is a software program where cloud-based and local components work together. The cloud application relies on remote servers for processing a logic that is accessed through a web browser. In an embodiment, cloud applications (e.g., a cloud application without a browser user interface) can leverage an existing authentication from a third party cloud application (e.g., an email application, an instant messaging application), which can be logged in through a web browser. Specifically, a cloud application authenticates a user identity through a particular browser user interface, then it is unnecessary for the cloud applications to authenticate the same user identity individually through different browser user interfaces. Further, it is unnecessary for the user to visit different browser user interfaces on a regular basis in order to keep authentication for the cloud applications. The cloud applications, for example, Slack application, IBM Watson Workspace application, etc., which run in containers on the cloud, can act on behalf of the user (i.e., take specific actions on behalf of a user) upon authentication and authorization.

In an embodiment, a browser plugin is provided. The cloud applications and identity providers are configured in the browser plugin, i.e., names of the cloud applications and identity providers are added into the browser plugin. The browser plugin watches user activities on the web browser (e.g., Chrome, Firefox, Safari, Internet Explorer, Edge, etc.), and automatically triggers logins for configured cloud applications (e.g., review application) on behalf of the user if any cloud application (can be configured or not configured) is logged in via the configured identity provider, because each configured cloud application needs authentication and authorization of the user identity to act on behalf of the user. The configured cloud applications can run on different servers, and it is unnecessary for the user to visit each sever individually through a web browser or other user interface. In other words, the configured cloud applications will be automatically authenticated and authorized, if any cloud application (no matter configured or not configured) is logged in via a configured identity provider. For example, an email application or an instant messaging application may be configured in the browser plugin, or may be not configured in the browser plugin. If the email application or the instant messaging application is not configured in the browser plugin, as long as it logs in through a configured identity provider, then the cloud applications configured in the browser plugin will be automatically authenticated and authorized.

In an embodiment, a user generally has a number of cloud applications that are used on a daily basis, such as an email application, an instant messaging application, etc. These cloud applications may be linked to a corporate identity provider to provide Single Sign-On (SSO) through protocols such as Security Assertion Markup Language (SAML), Open Authentication (OAuth) or other authentication method (e.g., basic authentication that uses account names and passwords). An identity provider (IdP) is a system entity that creates, maintains, and manages identity information for principals while providing authentication services to relying party applications within a federation or distributed network. SAML is a standard protocol for web browser Single Sign-On (SSO) using secure tokens. SAML uses standard cryptography and digital signatures to pass a secure sign-in token from an identity provider to a SaaS application. OAuth is an open standard for token-based authentication and authorization on the Internet. In an example, a corporate user logs in with a corporate email address. Only one-time login to the corporate identity provider suffices for all cloud applications running within the context of the same web browser. In addition to the cloud applications within the context of the same web browser, cloud applications configured in the browser plugin, even outside of the context of the same web browser (e.g., cloud applications not accessible through a web browser interface), can be automatically logged in or authenticated, and act on behalf of the user.

In an embodiment, a browser plugin is installed by the user for a particular web browser. The user can configure the installed browser plugin, and the configuration includes configuring one or more cloud applications and one or more corporate identity providers. The one or more cloud applications can act on behalf of the user, if a user authentication is performed successfully through an associated corporate identity provider once. The browser plugin keeps monitoring browser activities made by the user. When the user logs into any application via any of the identity providers configured in the browser plugin, the browser plugin notes that the identity provider (e.g., a corporate identity provider) has been activated. Accordingly, the same identity provider performs user authentication for each of the configured cloud applications, and passes an identity token to each of the configured cloud applications. Thus, all the configured cloud applications have the required identity token to act on behalf of the same user.

In an embodiment, the identity token expires after a predetermined time period, assuming the user may go offline within the predetermined time period. The identity token can be "refreshed" in response to a user interaction online. In an example, the identity token expires every 30 minutes, if the user fails to interact with any configured cloud application within 30 minutes, the user is automatically logged out. If the user needs to access any configured cloud application again, then the user has to log in again, and a new identity token is generated accordingly. Automatic user authentication by the same identity provider is based on the premise that the user logs into any application via one of the configured identity providers on a regular basis, and all the configured cloud applications can be issued with a same identity token. The identity token can be refreshed if the user interacts with any configured cloud application that has a browser user interface (e.g., an email application, an instant messaging application).

In an example, a review application (a configured cloud application without a browser user interface) is running in the cloud, and allows one or more users to cast a vote by an email application (a configured cloud application with a browser user interface) or by a chat room message application (a configured cloud application with a browser user interface). Three users named Bob, Stan, and John have voted earlier and have exited a review session (i.e., review application), while Peter is present at the review session. It is desirable to see votes cast by individuals instead of a review application, even though the three users are currently disconnected from the review session. Since a review application has been configured in the browser plugin of each user, and the review application can act on behalf of each user. The three users Bob, Stan, and John have been authenticated (e.g., Bob, Stan, and John interacted with a configured email application through a browser user interface), and the review application can act directly on behalf of the three users. In the review session, Bob says I vote yes; Stan says I vote yes; John says I abstain; Peter says No; then the review application says: 2 Yes 1 abstain 1 No. By contrast, if the review application cannot act on behalf of each user, in the review session, the review application says Bob said vote yes; the review application says Stan said vote yes; the review application says John said abstain; Peter says No; then the review application says: 2 Yes 1 abstain 1 No.

In another example, an identity token of each user can be valid for three days. Bob made his vote choice last Tuesday; Stan made his vote choice last Friday; John made his vote this Monday during the review session. Bob interacted with his emails (a configured email application through a browser user interface) last Friday, and thus the review application has a refreshed identity token for Bob. Since Stan made his vote choice last Friday, the review application has a valid identity token for Stan this Monday, because the identity token of Stan is still within the valid time period of three days. The review application has a valid identity token for John since he interacted with the review session this Monday. In the review session this Monday, the review application acted on behalf of Bob and Stan to vote, while John voted by himself.

FIG. 1 is a diagram depicting an architecture 100 of enabling cloud applications to act on behalf of a user, according to embodiments provided herein. As shown in FIG. 1, a browser plugin 102 is integrated with a web browser, and a plurality of cloud applications, e.g., the email application 104, the instant messaging application 106, and the review application 108, etc., are configured in the browser plugin 102. Some of configured applications have a browser user interface (i.e., some of configured applications can have a direct interaction with the user), while the other configured applications do not have a browser user interface (i.e., the other configured applications cannot have a direct interaction with the user). A user identity for each of the configured cloud applications can be automatically authenticated if the user identity is authenticated by any application via any of the configured identity providers. Upon successful authentication, the configured cloud applications without a browser interface can directly act on behalf of the user. For example, the review application can act on behalf of the user to vote.

Figure 2:
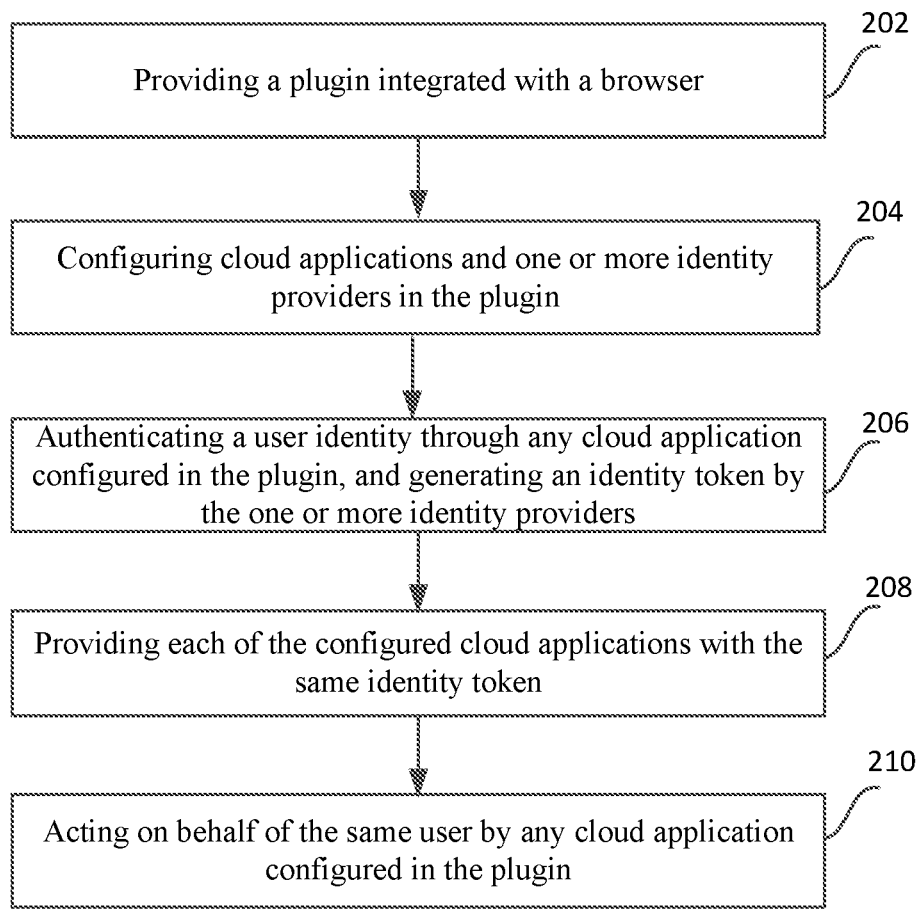
FIG. 2 is a flowchart illustrating a method 200 of enabling cloud applications to act on behalf of a user, according to embodiments provided herein.

FIG. 2 is a flowchart illustrating a method 200 of enabling cloud applications to act on behalf of a user, according to embodiments provided herein. As shown in FIG. 2, at step 202, a plugin is provided and integrated with a web browser. At step 204, a plurality of cloud applications, either having a browser user interface, or having no browser user interface, can be configured in the plugin. One or more identity providers are also configured in the plugin. At step 206, one of the configured cloud applications authenticates a user identity. For example, the user logs in a particular configured cloud application with a browser user interface, e.g., the email application 104 or the instant messaging application 106, then an identity token is generated by a corresponding identity provider and the user identity is authenticated by the email application 104 or the instant messaging application 106. At step 208, the identity token is shared with all the configured cloud applications by the corresponding identity provider. At step 210, with the valid identity token, any of the configured cloud applications without a browser user interface can directly act on behalf of the user. In an embodiment, it is unnecessary for the configured cloud applications having a browser user interface to act on behalf of the user, because the user can interact with the browser user interface directly. The identity token can be refreshed if the user interacts with any of the configured cloud applications, for example, checking an email, or leaving a message in a chatroom, etc., before the identity token expires.

Figure 3:
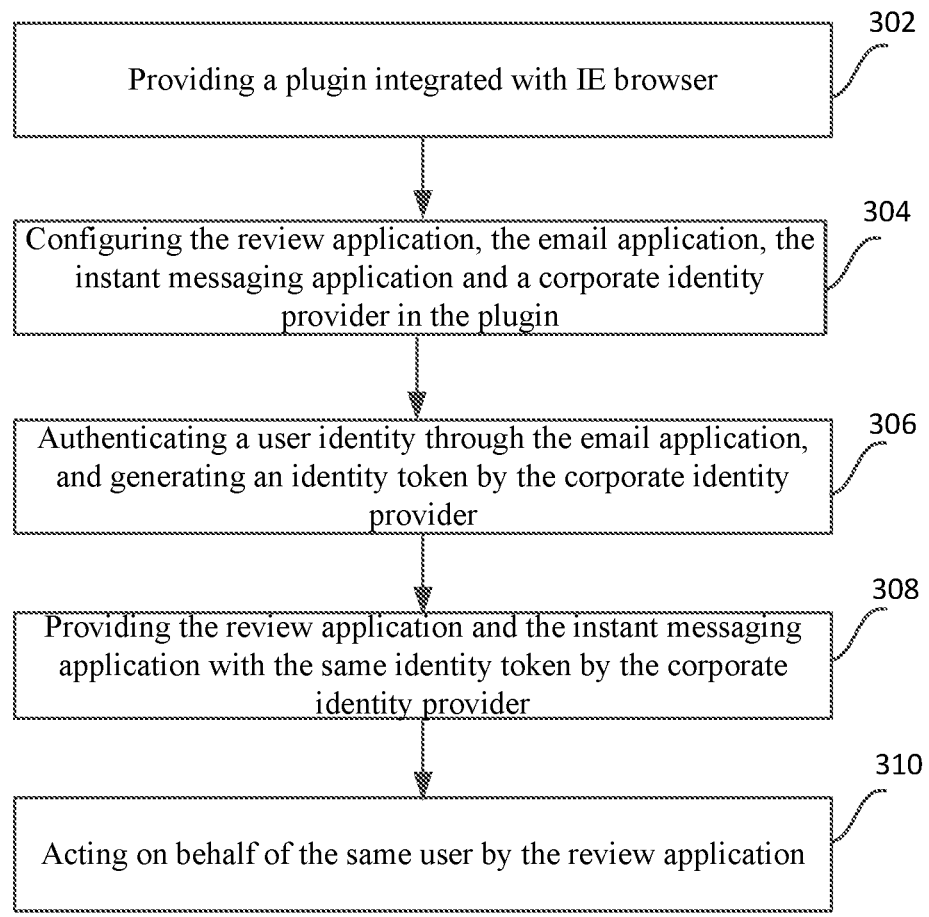
FIG. 3 is a flowchart illustrating a method 300 of enabling cloud applications to act on behalf of a user, according to an example.

FIG. 3 is a flowchart illustrating a method 300 of enabling cloud applications to act on behalf of a user, according to an example. As shown in FIG. 3, at step 302, a plugin is provided and integrated with internet explorer (IE) web browser. At step 304, the review application 108, the email application 104, and the instant messaging application 106, etc., and a corporate identity provider are configured in the plugin. The review application 108 is running in the cloud and allow users to cast a vote by email or by a chat room message. At step 306, the email application 104 authenticates a user identity. Specifically, the user logs in the email application 104 with the IE browser user interface using an email address and a password, then an identity token is generated by the corporate identity provider and the user identity is authenticated successfully by the email application 104. At step 308, the browser plugin monitors the browser activity and notes that the corporate identity provider has been activated, then the browser plugin calls the corporate identity provider on behalf of each of the configured cloud applications. Specifically, the corporate identity provider shares the generated identity token with the review application 108 and the instant messaging application 106, indicating that the user identity is also authenticated successfully by the review application 108 and the instant messaging application 106. At step 310, with the valid identity token, the review application 108 without a browser user interface, can directly act on behalf of the user to vote. The identity token can be refreshed if the user interacts with the email application 104 or the instant messaging application 106, for example, checking an email, or leaving a message in a chatroom, etc., before the identity token expires.

In this disclosure, if there are a large number of cloud applications that require authentication of the user identity, it is unnecessary for the user to log into each cloud application individually. Instead, a single authentication from any cloud application configured in the browser plugin enables automatic authentications for all the configured cloud applications.

Figure 4:
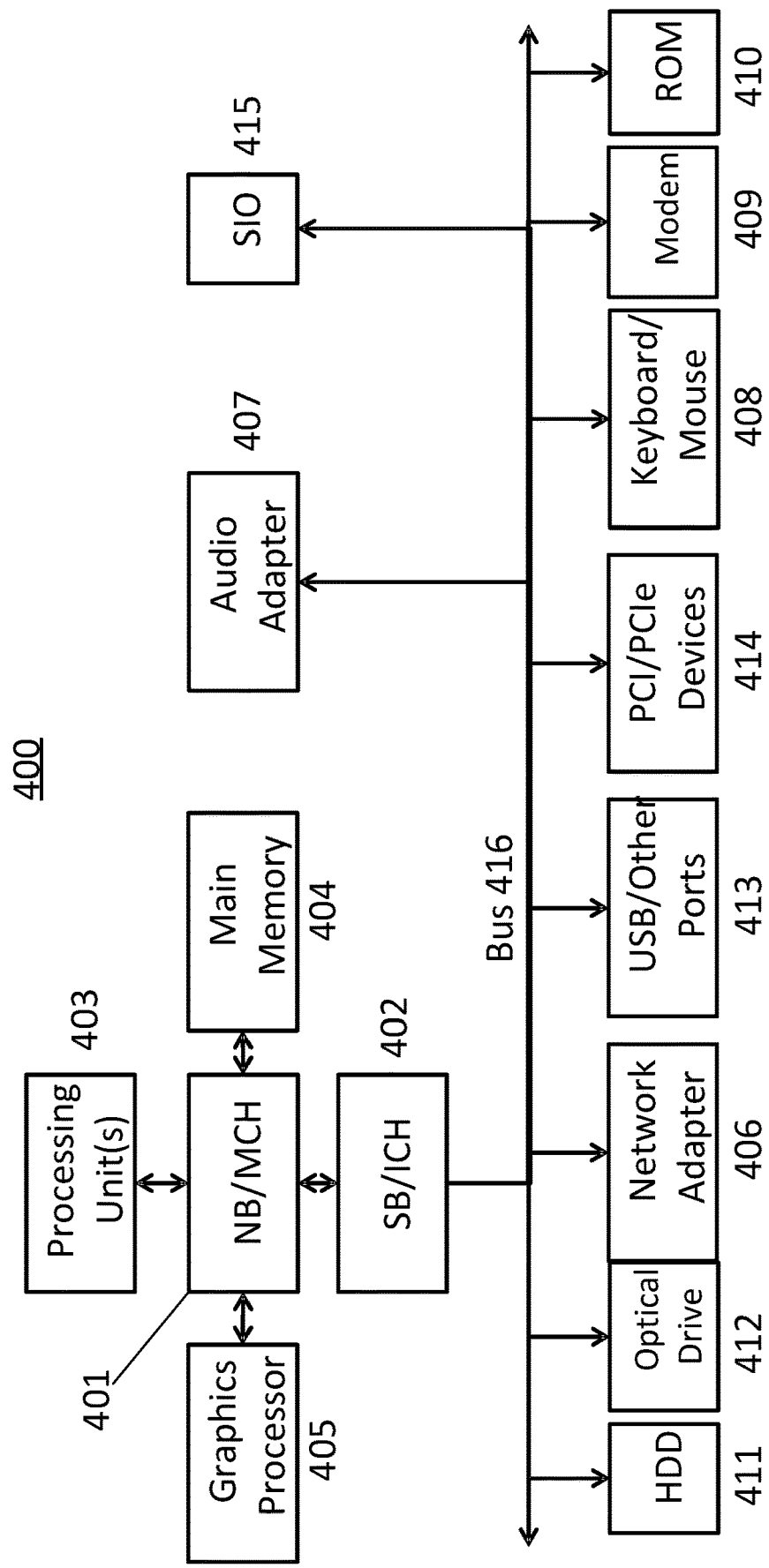
FIG. 4 is a block diagram of an example data processing system 400 in which aspects of the illustrative embodiments are implemented.

FIG. 4 is a block diagram of an example data processing system 400 in which aspects of the illustrative embodiments are implemented. Data processing system 400 is an example of a computer, such as a server or client, in which computer usable code or instructions implementing the process for illustrative embodiments of the present invention are located. In one embodiment, FIG. 4 may represent a server computing device.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH 401 through, for example, an accelerated graphics port (AGP) (not shown in FIG. 4).

In the depicted example, a network adapter 406 connects to the SB/ICH 402. An audio adapter 407, keyboard and mouse adapter 408, modem 409, read only memory (ROM) 410, hard disk drive (HDD) 411, optical drive (e.g., CD or DVD) 412, universal serial bus (USB) ports and other communication ports 413, and PCI/PCIe devices 414 may connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. A super I/O (SIO) device 415 can be connected to the SB/ICH 402.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System P® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments described herein can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or the network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operation steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

I claim:

1. A computer implemented method in a data processing system comprising a processor and a memory comprising instructions, which are executed by the processor to cause the processor to implement the method for enabling cloud applications to act on behalf of a user, the method comprising:
    providing, by the processor, a browser plugin integrated with a web browser;
    adding, by the processor, names of a plurality of cloud applications and names of a plurality of identity providers in the browser plugin, wherein the plurality of cloud applications include a review application, an email application, and an instant messaging application;
    continuously monitoring, by the browser plugin, browser activities made by the user;
    authenticating, by the processor, a user identity by the email application through one of the plurality of identity providers;
    generating, by the one of the plurality of identity providers, an identity token responsive to authentication of the one of the plurality of cloud applications;
    providing, by the one of the plurality of identity providers, the review application and the instant messaging application with the identity token; and
    acting, by the review application, on behalf of the user with the generated identity token.

2. The method as recited in claim 1, wherein at least one of the plurality of cloud applications has no browser user interface, wherein the user indirectly interacts with the at least one of the plurality of cloud applications.

3. The method as recited in claim 2, wherein the identity token expires within a predetermined time period.

4. The method as recited in claim 3, further comprising:
    refreshing, by the processor, the identity token within the predetermined time period by interacting with any of the plurality of the cloud applications having a browser user interface.

5. The method as recited in claim 1, wherein the one of the plurality of identity providers enable Single Sign-On (SSO) through Security Assertion Markup Language (SAML), or Open Authentication (OAuth).

6. A computer program product for enabling cloud applications to act on behalf of a user, the computer program product comprising a computer readable storage medium having program instructions embodied therewith, the program instructions executable by a processor to cause the processor to:
    provide a browser plugin integrated with a web browser;
    add names of a plurality of cloud applications and a name of an identity provider in the browser plugin, wherein the plurality of cloud applications include a review application, an email application, and an instant messaging application;
    continuously monitor, by the browser plugin, browser activities made by the user;
    authenticate a user identity by the email application through the identity provider;
    generate, by the identity provider, an identity token responsive to authentication;

provide, by the identity provider, the review application and the instant messaging application with the identity token; and act, by the review application, on behalf of the user with the generated identity token.

7. The computer program product as recited in claim 6, wherein at least one of the plurality of cloud applications has no browser user interface, wherein the user indirectly interacts with the at least one of the plurality of cloud applications.

8. The computer program product as recited in claim 7, wherein the identity token expires within a predetermined time period.

9. The computer program product as recited in claim 8, the processor is further caused to:

refresh the identity token within the predetermined time period by interacting with any of the plurality of cloud applications.

10. The computer program product as recited in claim 7, wherein the identity provider enables Single Sign-On (SSO) through Security Assertion Markup Language (SAML), or Open Authentication (OAuth).

11. A system for enabling cloud applications to act on behalf of a user, comprising:

a browser plugin integrated with a web browser;

a processor and a memory comprising instructions, which are executed by the processor to cause the processor to:

add names of a plurality of cloud applications and a name of an identity provider in the browser plugin, wherein the plurality of cloud applications include a review application, an email application, and an instant messaging application;

continuously monitor, by the browser plugin, browser activities made by the user;

authenticate a user identity by the email application through the identity provider;

generate, by the identity provider, an identity token responsive to authentication;

provide, by the identity provider, the review application and the instant messaging application with the identity token; and act, by any of the plurality of cloud applications, on behalf of the user with the identity token.

12. The system as recited in claim 11, wherein at least one of the plurality of cloud applications has no browser user interface, wherein the user indirectly interacts with the at least one of the plurality of cloud applications.

13. The system as recited in claim 12, wherein the identity token expires within a predetermined time period.

14. The system as recited in claim 13, the processor is further caused to:

refresh the identity token within the predetermined time period by interacting with any of the plurality of cloud applications.

15. The system as recited in claim 12, wherein the identity provider enables Single Sign-On (SSO) through Security Assertion Markup Language (SAML), or Open Authentication (OAuth).

* * * * *